United States Patent Office 3,536,654
Patented Oct. 27, 1970

3,536,654
HEAT-CURABLE SOLUTION COATING COMPOSITIONS OF AN EPOXY-AMINE ADDUCT AND AN IMIDAZOLE, THEIR PREPARATION AND USE
William L. Lantz, Metuchen, and Joseph P. Manasia, Union, N.J., assignors to Shell Oil Company, New York, N.Y., a corporation of Delaware
No Drawing. Filed Dec. 27, 1966, Ser. No. 604,586
Int. Cl. C08g 51/28
U.S. Cl. 260—33.6        14 Claims

ABSTRACT OF THE DISCLOSURE

Solution compositions which are stable at room temperature but cure in about 2 to 5 minutes at 300–400° F. to form hard, solvent resistant and steam resistant coatings comprise a mixture of (1) an adduct of a polyepoxide and an amine, (2) an imidazole compound and (3) an organic solvent.

---

This invention relates to new heat-curable solution coating compositions, to their preparation and use. More particularly, the invention relates to new liquid coating compositions containing special epoxy-containing condensates which cure at a rapid rate at moderate temperatures to give coatings having excellent physical properties, to the preparation of the compositions, and to their use, particularly for the coating of metal objects and the like.

Specifically, the invention provides new and particularly useful solution coating compositions which are stable for many days at room temperature but cure in about 2 to 5 minutes at 300° F.–400° F. to form hard solvent resistant and steam resistant coatings. The new compositions comprise a mixture of (1) a special adduct of a polyepoxide, and preferably a liquid glycidyl polyether of a polyhydric phenol, and an amine, such as aminophenol, which adduct has a softening point of between about 79° C. and 125° C., and preferably 90° C. and 125° C., and a WPE of 400 to 932, (2) a heterocyclic compound possessing in the ring a substituted imino group and a secondary amino group, and preferably an imidazole compound, and (3) an organic solvent, and preferably an aromatic hydrocarbon, such as xylene.

Epoxy resins, such as the commercially available glycidyl polyethers of polyhydric phenols, have been used in the past for the preparation of coating compositions. They have not been useful for certain application, however, such as in the automated strip coating lines, because of their slow rate of cure even at the elevated temperatures. Further disadvantage to prior known epoxy coatings is that they have poor pot life, i.e., they have to be used within a few hours of preparation. In addition, the cured coatings have lacked superior type of physical properties, such as resistant to steaming, solvents, etc. needed for certain specialized applications.

It is an object of the invention, therefore, to prepare new solution rapid curing coating compositions and a method for their preparation. It is a further object to provide new heat-curable epoxy resin solution compositions which can be cured at a rapid rate at moderate temperatures. It is a further object to provide new one package epoxy solution coating compositions which remains stable at room temperature for several days. It is a further object to provide new heat-curable solution coating compositions which can be cured at a rapid rate to form coatings having excellent physical properties. It is a further object to provide new heat-curable coating compositions which cure to form films having excellent resiliency, good solvent resistance to steam. These and other objects of the invention will be apparent from the following detailed description thereof.

It has now been discovered that these and other objects are accomplished by the new heat-curable solution coating compositions of the invention comprising mixtures of (1) a special adduct of a polyepoxide, and preferably a liquid glycidyl polyether of a polyhydric phenol, and an amine, such as aminophenol, which adduct has a softening point of between 79° C. and 125° C., and a WPE of 400 to 932, (2) a heterocyclic compound possessing in the ring a substituted imino group and a secondary amino group, and preferably an imidazole compound, and (3) an organic solvent, and preferably an aromatic hydrocarbon, such as xylene. It has been surprisingly found that these special compositions correct the above-noted difficulties as to coating compositions. The new composition, for example, can be cured in from 2 to 5 minutes at 300° F. to 400° F. to form hard solid coatings having excellent physical properties, such as good flexibility and resiliency, good solvent resistance and good resistance to steam. In addition, even though the compositions are heat-curable, they have good stability at room temperature and can be stored for several days at room temperature without gellation.

The special adducts used in the preparation of the new compositions of the invention comprise the acetone-soluble epoxy-containing adducts obtained by reacting polyepoxides, and preferably liquid glycidyl polyethers of polyhydric phenols, with polyamines which are preferably aromatic polyamines in controlled proportions so as to form solid adducts having a softening point between 79° C. and 125° C. and preferably 90° C. to 125° C. and a WPE of 400 to 932.

The polyepoxides used in making the adducts are those organic materials which have more than one vic-epoxy group, i.e., more than one

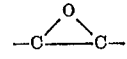

group, which may be a terminal group, i.e., a

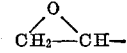

or in an internal position. The polyepoxides may be saturated or unsaturated, aliphatic, cycloaliphatic, aromatic or heterocyclic and may be substituted with substituents, such as chlorine, hydroxyl groups, ether radicals and the like.

Examples of such polyepoxides include, among others, 1,4-bis(2,3-epoxypropoxy)benzene, 1,3 - bis(2,3 - epoxypropoxy)benzene, 4,4′ - bis(2,3-epoxypropoxy)diphenyl ether, 1,8 - bis(2,3-epoxypropoxy)octane, 1,4 - bis(2,3-epoxypropoxy)cyclohexane, 4,4′ - bis(2 - hydroxy-3,4′-epoxybutoxy)diphenyl dimethylmethane, 1,3 - bis(4,5-epoxypentoxy) - 5 - chlorobenzene, 1,4 - bis(3,4-epoxybutoxy) - 2 - chlorocyclohexane, 1,3 - bis(2-hydroxy-3,4-epoxybutoxy)benzene, 1,4 - bis(2 - hydroxy-4,5-epoxypentoxy)benzene.

Other examples include the epoxy polyethers of polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (bisphenol A) 2,2-bis(4-hydroxyphenol)butane, 4,4' - dihydroxybenzophenone, bis(4 - hydroxyphenyl)ethane, 2,2 - bis(4 - hydroxyphenyl) pentane and 1,5-dihydroxynaphthalene. The halogen-containing epoxides may be further exemplified by 2 - chloro-2,3-chloro-1,2-epoxybutane, 3-bromo - 1,2 - epoxyhexane, 3-chloro - 1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four suitable glycidyl polyethers of dihydric phenols is illustrated in U.S. 2,633,458 and are designated Polyethers A, B, and C and D.

Another group of polyepoxides comprises the polyepoxy polyethers obtained by reacting, preferably in the presence of an acid-acting compound, such as hydrofluoric acid, or of the aforedescribed halogen-containing epoxides, such as epichlorohydrin, with a polyhydric alcohol, and subsequently treating the resulting product with an alkaline component. As used herein and in the claims, the expressions "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4-hydroxycyohexyl)dimethylmethane and the like.

The preparation of suitable polyepoxide polyethers is illustrated in U.S. 2,633,458 as Polyether F.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products, preferably have an epoxy equivalency greater than 1.0, and still more preferably between 1.1 and 4 and a molecular weight between 30 and 1,000.

Another group of polyepoxides include the epoxy esters of polybasic acids, such as diglycidyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soyabean, perilla, oiticica, tung, walnut, and dehydrated castor oil, methyl linoleate, butyl linoleate, ethyl 9,12-octadecadienoate, butyl 9,12,15-octadecatrienoate, ethyl eleostearate, octyl 9,12-octadecadienoate, methyl eleostearate, monoglycerides of tung oil fatty acids, monoglycerides of soyabean oil, sunflower, rapeseed, hemseed, sardine, cottonseed oil, and the like.

Another group of the epoxy-containing material having internal epoxy groups include the epoxidized esters of unsaturated alcohols having the ethylenic group in an internal position and polycarboxylic acids, such as, for example, di(2,3-epoxybutyl)adipate, di(2,3-epoxybutyl)oxalate, di(2,3-epoxyhexyl)succinate, di(2,3-epoxyoctyl)tetrahydrophthalate, di(4,5-epoxydodecyl)maleate, di(2,3-epoxybutyl)terephthalate, di(2,3-epoxypentyl)thiodipropionate, di(2,3-epoxybutyl)citrate and di(4,5-epoxyoctadecyl)malonate, as well as the esters of epoxycyclohexanol and epoxycyclohexylalkanols, such as, for example, di(2,3-epoxycyclohexylmethyl)adipate and di-(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-cyclohexanoate, 2,3-epoxycyclohexylmethyl 2,3 - epoxycyclohexanoate, and 3,4-epoxycyclohexyl 4,5-epoxyoctanoate, and the like.

Another group of materials having internal epoxy groups include epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,11,13-diepoxyeicosanedioate, dibutyl 7,8,11,12-diepoxyoctadecanedioate dioctyl 10,11-diethyl-8,9,12,13 - diepoxyeicosanedioate, dicyclohexyl 3,4,5,6-diepoxycyclohexane - dicarboxylate, dibenzyl 1,2,4,5 - diepoxycyclohexane - 1,2 - dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (hycar rubbers), butadiene styrene copolymers and the like.

Still another group includes the epoxidized hydrocarbons, such as epoxidized 2,3-bis(cyclohexenyl)propane, 2,2-bis(cyclohexenyl)butane, 8,10-octadecadiene and the like.

The other component to be used in making the special adducts comprise an amine, and preferably an aromatic amine. These amines have at least two hydrogen attached to amino nitrogen and the amino nitrogen is or are preferably attached to an aromatic ring. Examples of the amines include among others, aniline, methylene dianiline, meta-phenylene diamine, meta-aminophenol, cyclohexylamine, hexamethylene diamine, toluidine, alpha-naphthylamine, beta - naphthylamine, aminodiphenyl, piperazine, N,N'-dimethyl-m-phenylenediamine, 4,4' - diaminophenylsulfone, 4,4' - diaminophenylpropane, 4,4' - diaminodiphenylethane, and the like, and mixtures thereof. Particularly preferred amines to be used include the primary amines and preferably aromatic primary mono- and diamines possessing from 1 to 2 amino nitrogen attached to aromatic rings and containing from 6 to 24 carbon atoms.

The adducts are prepared by combining one or more of the above-described polyepoxides with one or more of the above-noted amines and heating the resulting mixture. In order to obtain the desired adducts instead of gelled resinous masses which are useless for the present purpose, it is necessary that an important detail be observed, namely, that a proper proportion of reactants be used. In order to obtain the desired products, one should employ a slight excess of the polyepoxide. The equivalent excess of the polyepoxide should vary from about .33 to .033 equivalents. By chemical equivalent amount as used herein is meant that amount needed to furnish one epoxide group for every amino hydrogen.

If one uses an amine which has a functionality greater than 2, the amount of polyepoxide and amine used should be such that the total overall average functionality of reactants should be between 2 and 2.5. This overall functionality can be determined by the following equation:

$$\frac{\frac{(X)(WX)}{(MX)} + \frac{Y(WY)}{(MY)} + \cdots\ ^1}{\text{Total number of moles per 100 grams of reactants}} = 2 \text{ to } 2.5$$

X = number of epoxy groups per mole of the polyepoxide.
MX = molecular weight of the polyepoxide.
WX = weight percent of total reactants of polyepoxide.
Y = number of amine hydrogen atoms on amine molecule.
MY = molecular weight of the amine.
WY = weight percent of total reactants of amine.

[1] If more than one amine or polyepoxide is used, the equation should be continued with the same information about that reactant.

The temperature employed in the formation of the adducts may vary from about 20° C. to 250° C. Preferred temperatures range from 20° C. to 150° C. It is generally preferred to initiate the condensation at a low temperature, e.g., 20° C. to 110° C. and allow the reaction to exotherm to no higher than 250° C. Cooling may be applied as needed. The period at the higher temperature should be as short as possible, e.g., 1 to 20 minutes, in order to avoid danger of runaway reactions. The reaction is preferably effected under atmospheric pressure although superatmospheric or subatmospheric pressures may be utilized as desired.

Solvents or diluents may be employed in the reaction if desired, but in most cases one or more of the reactants will be liquid and the mixing can be effected without the use of solvents. Suitable solvents if needed, include xylene, benzene, cyclohexane, dioxane, diethyl ether and the like.

The adducts may be recovered from the reaction mixture by any suitable means. If solvents or diluents are employed, they may be removed by evaporation, distillation, and the like. In the absence of such solvents or diluents, the adducts are generally recovered and used as the crude reaction product.

The adducts to be used in the process of the invention will be solid products having a softening point between 79° C. to 125° C., and more preferably 90° C. to 125° C. These softening points are determined by the Hercules method. The adducts will also have a WPE value of 400 to 932. WPE is weight in grams of the condensate needed to supply 1 epoxy group. It is determined by a silver nitrate-HCl method. According to this method, the condensate is added to a solution of HCl in tetrahydrofuran wherein the epoxy groups react with the HCl. The solution is then back titrated with silver nitrate to determine unreacted HCl. A sample without the condensate is also titrated with AgNO₃. The calculation is determined by the formula:

$$\frac{\left(\begin{array}{c}\text{Milliliters of}\\ \text{AgNO}_3\\ \text{reagent sample}\end{array} - \begin{array}{c}\text{milliliters of}\\ \text{AgNO}_3 \text{ used for}\\ \text{sample containing}\\ \text{condensate}\end{array}\right)\left(\begin{array}{c}\text{normality of}\\ \text{AgNO}_3\end{array}\right)}{\text{Weight of condensate sample}}$$

= X (milliequivalents epoxy per gram sample)

$$\frac{1(100)}{\frac{(X)(100)}{(1000)}} = WPE$$

or $$\frac{1000}{(X)} = WPE$$

The lower the WPE the more reactive the adduct. Adducts having WPE over 625 are generally preferred when highly flexible products are desired.

The preparation of some of the adducts by the above method using aniline as the amine and Polyether A of U.S. 2,623,458 as the polyepoxide is shown in the following table.

The other component to be used in making the new compositions of the invention include the heterocyclic amines which possess in the ring a substituted imino group, i.e., a

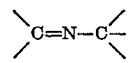

group, and a secondary amino group, i.e., a =N—H group. Preferred examples of these compounds include, among other, the imidazoles, such as compounds of the formula

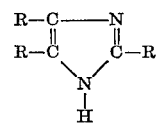

or

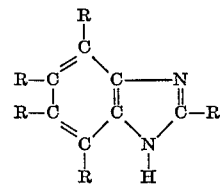

wherein R is hydrogen, halogen or an organic radical, such as hydrocarbon radical or substituted hydrocarbon radical as the ester, ether, amide, imide, amino, halogen or mercapto substituted hydrocarbon radicals. Especially preferred are the imidazoles wherein R is hydrogen or a hydrocarbon radical, and preferably an alkyl, alkenyl, cycloalkyl, cycloalkenyl, aryl, alkaryl or arylalkyl radicals and particularly those containing no more than 15 carbon atoms. Examples of such compounds include, among others, imidazole, 2 - ethyl - 4 - methylimidazole, benzimidazole, 2,4-dioctyl imidazole, 2-cyclohexyl-4 - methyl imidazole, 2-butoxy-4-allyl imidazole, 2 - carboethoxybutyl-4-methyl imidazole, 2,4-dichlorobutyl imidazole, 2-octyl-4-hexyl imidazole, and 2-ethyl-4-phenyl imidazole, and mixtures thereof. Other examples include, among others, the salts and other derivatives of the above-noted imidazole compounds such as their monocarboxylic acid salts as for example, their acetate, lactate, benzoate, and the like salts.

The proportion of the adduct and the heterocyclic amine to be used in the compositions may vary within certain limits. In general, it is preferred to utilize from

TABLE I.—ANILINE-BASED CONDENSATES

| Adduct | A | B | C | D | E | F | G | H | I | J |
|---|---|---|---|---|---|---|---|---|---|---|
| Batch size, lb | 60.0 | 7.9 | 7.9 | 60.0 | 7.9 | 60.0 | 7.9 | 60.0 | 1.3 | 1.8 |
| Reaction conditions: | | | | | | | | | | |
| Composition, percent w.: | | | | | | | | | | |
| Polyether A | 87.2 | 84.9 | 84.3 | 89.7 | 86.2 | 91.8 | 87.4 | 88.7 | 84.3 | 85.8 |
| Aniline | 12.8 | 14.6 | 15.2 | 5.3 | 9.8 | 5.4 | 10.1 | 5.2 | | 13.5 |
| Salicylic acid | | 0.5 | 0.5 | | | 0.5 | | 0.5 | | |
| Methylenedianiline | | | | 5.0 | 3.5 | | | | | |
| Meta-phenylenediamine | | | | | | 2.8 | 2.6 | | | |
| m-Aminophenol | | | | | | | | 6.1 | | |
| Cyclohexylamine | | | | | | | | | 15.7 | |
| Hexamethylenediamine | | | | | | | | | | 0.7 |
| Initiation temp., °C | 110 | 49 | 62 | 120 | 52 | 116 | 50 | 57 | 39 | 110 |
| Time to max. temp., min | 20 | 30 | 19 | 16 | 27 | 18 | 28 | 40 | 39 | 23 |
| Max. temp., °C | 189 | 192 | 201 | 185 | 184 | 189 | 188 | 158 | 176 | 213 |
| Time at max. temp., min | 14 | 11 | 12 | 20 | 3 | 20 | 1 | 19 | 20 | 3 |
| WPE | 552 | 821 | 932 | 417 | 640 | 412 | 632 | 450 | 781 | 731 |
| Melting point, °C | 86 | 101 | 104 | 83 | 100 | 79 | | 85 | 97 | 97 |

.05 to 6 parts of the heterocyclic amine per 100 parts of the adduct. Preferred amounts vary from about .1 part to 5 parts of the heterocyclic amine per 100 parts of the adduct.

The new heat-curable epoxy resin compositions of the present invention are obtained by mixing the above-described special adducts and heterocyclic amine with a liquid organic solvent. Various types of solvents may be utilized for obtaining the desired fluidity. They may be volatile solvents which escape from the compositions by evaporation before or during the curing, such as ketones like acetone, methyl ethyl ketone, mathyl isobutyl ketone, isophorone, etc., esters, such as ethyl acetate, butyl acetate, Cellosolve acetate, (acetate of ethylene glycol monoethyl ether), acetate of ethylene glycol monoethyl ether, etc.; chlorinated hydrocarbons such as trichloropropane, chloroform, etc. Solvents which remain in the cured composition may also be used, such as diethyl phthalate, dibutyl phthalate, or liquid monoepoxides, such as glycidyl allyl ether, glycidyl phenyl ether, styrene oxide, 1,2-hexylene oxide, glycide, and the like, as well as cyano-substituted hydrocarbons, such as acetonitrile, propionitrile, adiponitrile, benzonitrile, and the like. Other solvents, that can be used include the hydrocarbons, such as cyclohexane, xylene, benzene, toluene, isohexane, isoheptane, and the like, and mixtures thereof. Mixtures of solvents, such as mixtures of the ketones, Cellosolve acetate, aromatic hydrocarbons and the like, are particularly preferred.

The amount of the solvent to be employed may vary over a wide range depending on the intended use of the solution, etc. For most applications, it is preferred to employ solvents so as to form solutions having from 10% to 50% solids content.

The mixing of the components may vary over a wide range of temperature. In general, it is preferred to effect mild heating in order to dissolve the solid adducts and/or heterocyclic amine. Such temperatures generally vary from about 20° C. to about 60° C.

Other ingredients may also be added to the solution as desired. This includes flow control agents, pigments, dyes, plasticizers, stabilizers, other types of resins and modifiers, such as asphalts, tars, and the like.

The new solution compositions of the invention may be converted to hard insoluble infusible products by heating the solution above the curing temperature for a short period. Temperatures to be used in the cure preferably range from about 275° F. to about 450° F. and more preferably between 300° F. and 350° F.

The new solution compositions of the invention may be utilized for a great many different applications. They may be used for example, as adhesives and bonding materials for a various of different surfaces, such as metal, wood, ceramics, cement, plaster, and the like. In these applications, the solution composition is placed alone or in combination with other liquid adhesive materials between the desired surfaces to be adhered together and pressure and heat then applied to effect the cure. Preferred temperatures range from about 250° F. to about 450° F.

Because of their ability to be cured quickly at moderate temperatures, the new compositions are particularly suited for use in the preparation of coating and impregnating compositions. In this application, the compositions are sprayed, brushed, dipped or otherwise applied to the desired surface and the coating then heated by suitable means to a curing temperature of preferably 250° F. to about 450° F. for a few minutes. Such a procedure may be used to coat various types of surfaces, such as metal surfaces, wood, cement, roadways, walkways, and the like. As noted above, the resulting films are outstanding in their resilience, solvent resistance and resistance to steam.

The compositions of the invention are particularly useful for filament winding applications. In the application the filaments such as, for example, glass fibers are passed into and through the liquid composition of the invention and then wound onto the desired mandrel or form and the formed unit allowed to cure by application of heat. The great advantage of the new compositions in this application is the fact that the composition can be cured at moderate temperatures and their use would thus not effect heat sensitive material. For example, the rubber lining of missile cases are heat sensitive and would be affected by use of high temperatures for curing material thereon. The new compositions thus could be used for the filament winding of these cases where the winding is directly on the liner.

The above-described systems are also useful in the preparation of laminates. In this application, the sheets of fibrous material are first impregnated with the composition of the invention. The sheets of fibrous material are impregnated with the mixture by spreading it thereon or by dipping or otherwise immersing them in the impregnant. The solvent is conveniently removed by evaporation and the mixture is cured to the fusible resin state. Although this operation may be conducted at room temperature (20 to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C. A plurality of the impregnated sheets are then superposed and the assembly is cured in a heated press under a pressure of about 25 to 500 or more pounds per square inch. The resulting laminate is extremely strong and resistant against the action of organic and corrosive solvents. The fibrous material used in the preparation of the laminates may be of any suitable material, such as glass cloth and matting, asbestos, paper, mica flakes, cotton bats, duck muslin, canvas, synthetic fibers such as nylon, Dacron and the like. It is usually preferred to utilize woven glass cloth that has been given prior treatment with well known finishing or sizing agents, therefore, such as chrome methacrylate or vinyl trichlorosilane.

To illustrate the manner in which the present invention may be carried out, the following examples are given. The examples are given only to illustrate the invention and are not to be regarded as limiting the invention in any way. Unless otherwise indicated, parts and percentages disclosed in the examples are by weight. The polyethers referred to by letter, such as Polyether A, are those disclosed in U.S. 2,633,458.

EXAMPLE I

This example illustrates the preparation of a heat-curable epoxy resin solution composition from (1) an adduct of Polyether A as disclosed in U.S. 2,633,458 and aniline, and (2) imidazole.

An adduct was prepared from Polyether A and aniline having a WPE of 552 and a softening point of 86° C. (adduct A). 100 parts of this adduct was dissolved in a solvent made up of 52 parts methyl isobutyl ketone, 52 parts Cellosolve acetate and 52 parts of xylene, by heating to 120° F. 3 parts of imidazole and 1 part of a polysiloxane flow control agent were stirred into this resin solution after it had cooled to room temperature. The resulting solution had 40% solids content and a color rating on the Gardner-Holt scale of 2. This solution containing the imidazole was stable at room temperature for over seven days.

Tin plates were coated with the above-noted solution to form a film of about ¼ mil thickness and the plates baked for 3 minutes at 175° C. The resulting films were hard but flexible and had good resistance to solvents and steam.

Samples of the coated tin plates were bent double and placed in a pressure cooker filled with distilled water so that approximately ⅔ or the specimen was immersed in water. Heat was then applied and when full pressure was reached (15 p.s.i.g.), time was recorded. After 1½ hours, heat was turned off and cooker cooled to room temperature with cold water. Specimens were removed, wiped dry and rated immediately and after 24 hours. The results are summarized below.

Immediately
DC tin plate:
    Vapor _____ 10
    Liquid _____ 10
CP tin plate:
    Vapor _____ 10
    Liquid _____ 10

After 24 hours
DC tin plate:
    Vapor _____ 10
    Liquid _____ 10
CP tin plate:
    Vapor _____ 10
    Liquid _____ 9–10
Rating: 10 best.

Samples of Bonderite panels (phosphate etched steel) were also coated with the above-described solution composition and cured at the temperatures indicated in the table below. The cured films were then tested for flexibility, impact resistance and methyl ethyl ketone. The results are shown below:

Samples of the cured film were also tested for resistance to xylene, 50% sulfuric acid, concentrated ammonium hydroxide, 25% acetic acid and ethanol. The results are shown below:

Chemical and solvent resistance

Corrosive media:
    Xylene
    50% Sulfuric acid
    Conc. ammonium hydroxide } Unaffected 70 days.
    25% acetic acid
    Ethanol

EXAMPLE II

Example I is repeated with the exception that the adduct employed is an adduct of Polyether A and methylene dianiline having a WPE of 417 and a softening point of 83° C. (Adduct D in Table I). Related results are obtained.

EXAMPLE III

Example I is repeated with the exception that the adduct employed is an adduct of diglycidyl ether of resorcinol and meta-phenylene diamine. Related results are obtained.

EXAMPLE IV

Example I is repeated with the exception that the adduct employed is as shown in the following table:

Adduct of Polyether A and aniline having WPE 821 and softening point 101° C. (B)
Adduct of Polyether A and aniline having a WPE 932 and softening point 104° C.
Adduct of Polyether A and methylene dianiline having a WPE of 412 and a softening point of 79° C. (F)
Adduct of Polyether A and methylene dianiline having a WPE of 632 and a softening point of 98–106° C. (G)
Adduct of Polyether A and meta-aminophenol having a WPE of 450 and softening points of 85° C. (H)
Adduct of polyether A and cyclohexylamine having a WPE of 781 and a softening point of 97° C. (I)
Adduct of Polyether A and hexamethylene diamine having a WPE of 731 and softening point of 97° C. (J)

Related results are obtained in each case.

EXAMPLE V

EXAMPLE I to IV are repeated with the exception that the imidazole is replaced by benzimidazole. Coatings having superior physical properties are obtained.

EXAMPLE VI

Examples I to IV are repeated with the exception that the imidazole is replaced by the lactate salt of imidazole. Related results are obtained.

EXAMPLE VII

Examples I and IV are repeated with the exception that the imidazole is replaced with each of the following:
benzoate salt of imidazole
acetate salt of 2-ethyl-4-methylimidazole.
benzimidazole acetate
benzimidazole formate
benzimidazole phosphate
Related results are obtained.

| Cure time (minutes) | Cure temperature (°F.) | Flexibility | | Impact (in./lb.) | MEK resistance (minutes) |
|---|---|---|---|---|---|
| | | Conical mandrel | ⅛" mandrel, deg. | | |
| 5 | 300 | Pass | >180 | >160 | >60 |
| 3 | 350 | ---do--- | >180 | >160 | >60 |
| 2.5 | 400 | ---do--- | >180 | >160 | >60 |

We claim as our invention:

1. A heat-curable epoxy resin solution composition comprising a mixture of:
   (1) an adduct of a polyepoxide having more than one vic-epoxy group and an aromatic amine possessing at least two active hydrogen atoms attached to amino nitrogen, which adduct is soluble in acetone, has a softening point of between about 79° C. and 125° C., and a WPE of 400 to 932 wherein WPE is the weight in grams needed to supply one epoxy group,
   (2) an amidazole compound of the formula:

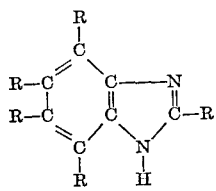

or

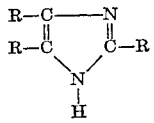

monocarboxylic acid salts of said imidazole compound or mixtures thereof wherein R is selected from the group consisting of hydrogen, halogen, hydrocarbon radicals, halogen-substituted hydrocarbon radicals and ether-substituted hydrocarbon radicals, and
   (3) an organic solvent.

2. A heat-curable epoxy resin solution composition capable of curing in less than about 1 minute at 300° C. comprising a mixture of:
   (1) an adduct of a liquid polyglycidyl ether of 2,2-bis(4-hydroxyphenyl)propane and an aromatic amine possessing at least two active hydrogen atoms attached to amino nitrogen, which adduct is soluble in acetone, has a softening point of between about 90° C. and 125° C., and a WPE of 400 to 932 wherein WPE is the weight in grams needed to supply one epoxy group,
   (2) an amidazole compound of the formula:

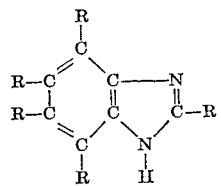

or

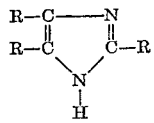

monocarboxylic acid salts of said imidazole compound or mixtures thereof wherein R is hydrogen or a hydrocarbon radical, said imidazole compound being present in an amount making up from 0.05 to 6 parts per 100 parts of the adduct, and
   (3) an organic solvent for the adduct and imidazole compound.

3. A composition as in claim 2 wherein the amine is methylene-dianiline.
4. A composition as in claim 2 wherein the amine is aniline.
5. A composition as in claim 2 wherein the amine is meta-amino phenol.
6. A composition as in claim 2 wherein the imidazole compound is imidazole.
7. A composition as in claim 2 wherein the imidazole compound is a compound of the formula:

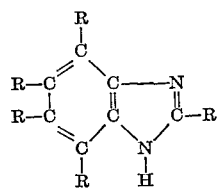

or

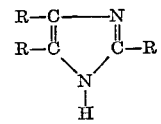

monocarboxylic acid salts of said imidazole compound or mixtures thereof wherein R is hydrogen or a hydrocarbon radical selected from the group consisting of alkyl, alkenyl, cycloalkyl, cycloalkenyl, aryl, alkaryl and arylalkyl radicals containing no more than 15 carbon atoms.

8. A composition as in claim 2 wherein the imidazole is a salt of an imidazole and an acid of the group consisting of acetic, formic, lactic, phosphoric, and benzoic acids.
9. A composition as in claim 2 wherein the imidazole compound is 2-methyl-4-ethyl imidazole.
10. A composition as in claim 2 wherein the solvent is an aromatic hydrocarbon.
11. A composition as in claim 2 wherein the solvent is xylene.
12. A composition as in claim 2 wherein the imidazole is the lactate salt of imidazole.
13. A process for converting the solution composition of claim 1 to a hard insoluble infusible product which comprises heating the composition to a temperature above 250° F. for a short period.
14. A process for preparing the composition in claim 1 which comprises mixing:
   (1) an adduct of a polyepoxide having more than one vic-epoxy group and an aromatic amine possessing at least two active hydrogen atoms attached to amino nitrogen, which adduct is soluble in acetone, has a softening point of between about 79° C. and 125° C., and a WPE of 400 to 932 wherein WPE is the weight in grams needed to supply one epoxy group,
   (2) an imidazole compound of the formula:

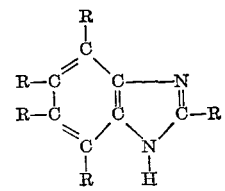

or

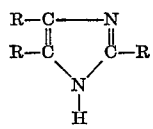

monocarboxylic acid salts of said imidazole compound or mixtures thereof wherein R is selected from the group consisting of hydrogen, halogen, hydrocarbon radicals, halogen-substituted hydrocarbon radicals and ether-substituted hydrocarbon radicals, and (3) an organic solvent.

References Cited

FOREIGN PATENTS 635,500  1/1962  Canada.

WILLIAM SHORT, Primary Examiner
T. E. PERTILLA, Assistant Examiner

U.S. Cl. X.R.

117—127, 148, 161; 161—184, 185; 260—2, 18, 30.4, 31.2, 32.4, 32.8, 47, 75, 78.4, 88.3